United States Patent
Shaffer et al.

(10) Patent No.: US 6,236,642 B1
(45) Date of Patent: *May 22, 2001

(54) APPARATUS AND METHOD FOR NETWORK RESOURCE PRESERVATION

(75) Inventors: Shmuel Shaffer, Palo Alto; William J. Beyda, Cupertino, both of CA (US)

(73) Assignee: Siemens Information and Communication Networks, Inc., Iselin, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,161

(22) Filed: Jul. 17, 1997

(51) Int. Cl.[7] ................ H04J 1/16; H04L 1/00; H04L 12/28; H04L 12/56
(52) U.S. Cl. ............ 370/237; 370/228; 370/238; 370/400; 370/410
(58) Field of Search ............ 370/400, 254, 370/255, 238, 351, 394, 237, 468, 410, 252; 340/827

(56) References Cited

U.S. PATENT DOCUMENTS

| | | |
|---|---|---|
| 4,494,138 | 1/1985 | Shimp . |
| 4,788,721 * | 11/1988 | Krishnan ................ 379/221 |
| 4,862,496 | 8/1989 | Kelly et al. . |
| 4,873,517 * | 10/1989 | Baratz et al. ................ 340/825 |
| 4,907,224 | 3/1990 | Scoles et al. . |
| 4,929,940 | 5/1990 | Franaszek et al. . |
| 4,991,204 * | 2/1991 | Yamamoto et al. ................ 379/221 |
| 5,003,534 | 3/1991 | Gerhardt et al. . |
| 5,012,469 | 4/1991 | Sardana . |
| 5,036,535 | 7/1991 | Gechter et al. . |
| 5,121,387 | 6/1992 | Gerhardt et al. . |
| 5,229,993 | 7/1993 | Foudriat et al. . |
| 5,235,599 * | 8/1993 | Nishimura et al. ................ 371/11.2 |
| 5,241,534 | 8/1993 | Omuro et al. . |
| 5,271,058 | 12/1993 | Andrews et al. . |
| 5,297,144 | 3/1994 | Gilbert et al. . |
| 5,331,631 | 7/1994 | Teraslinna . |
| 5,388,097 | 2/1995 | Baugher et al. . |
| 5,430,710 * | 7/1995 | Mueller et al. ................ 370/16 |
| 5,432,845 | 7/1995 | Burd et al. . |
| 5,452,294 * | 9/1995 | Natarajan ................ 370/54 |
| 5,502,722 | 3/1996 | Fulghum . |
| 5,528,583 | 6/1996 | Acampora et al. . |
| 5,528,622 | 6/1996 | Cadd et al. . |
| 5,586,120 | 12/1996 | Cadd . |
| 5,590,118 | 12/1996 | Nederlof . |
| 5,590,126 | 12/1996 | Mishra et al. . |
| 5,602,839 | 2/1997 | Annapareddy et al. . |
| 5,812,524 * | 9/1998 | Moran et al. ................ 370/228 |

* cited by examiner

*Primary Examiner*—Huy D. Vu
*Assistant Examiner*—M. Phan

(57) ABSTRACT

A data routing system for dynamically optimizing bandwidth which includes a network control unit, a route comparator, a reroute control unit and a packet reordering unit. The network control unit reserves the initial route from the source node to the end node. The route comparator determines whether an alternate route is more optimal than the initial route and the reroute control unit establishes the alternate route and reroutes the data over the alternate route. The packet reordering unit maintains the sequence of the data packets on the alternate route.

19 Claims, 4 Drawing Sheets

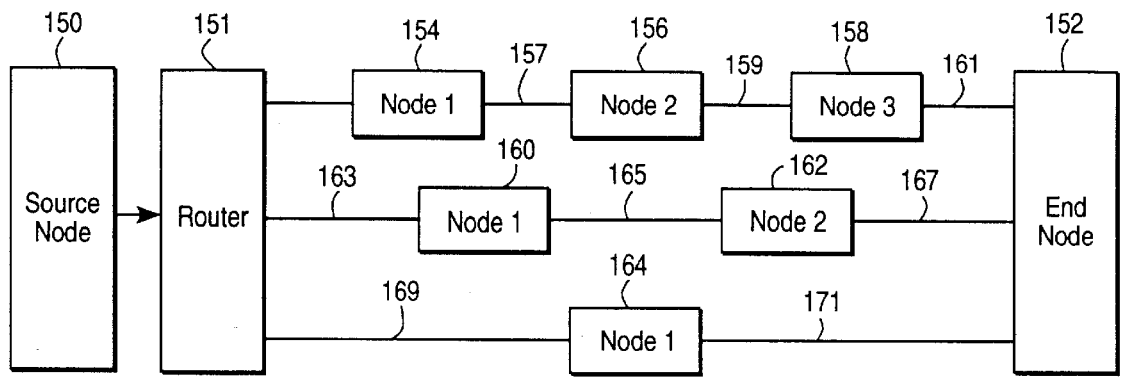
FIG_2
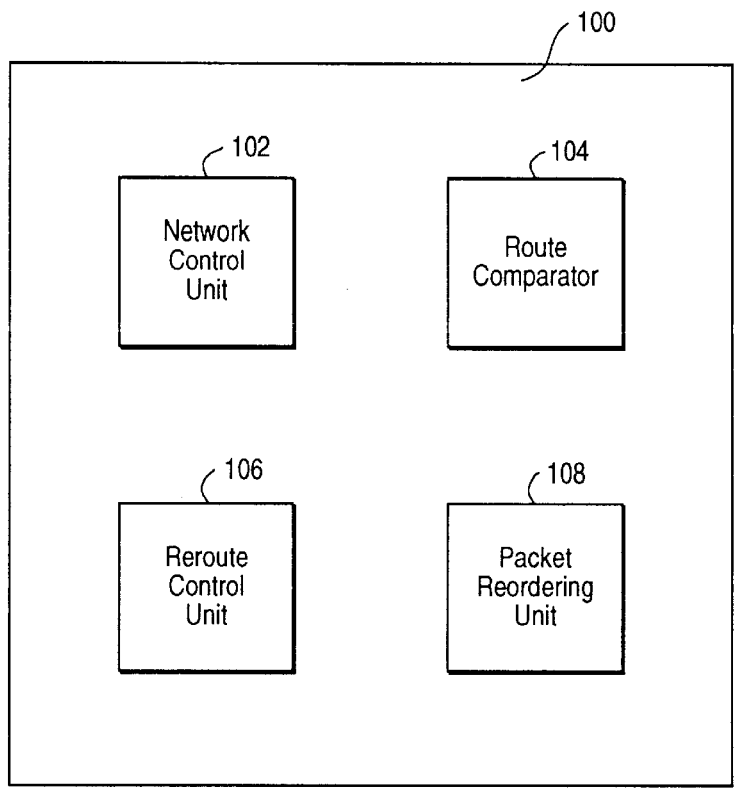
FIG_1

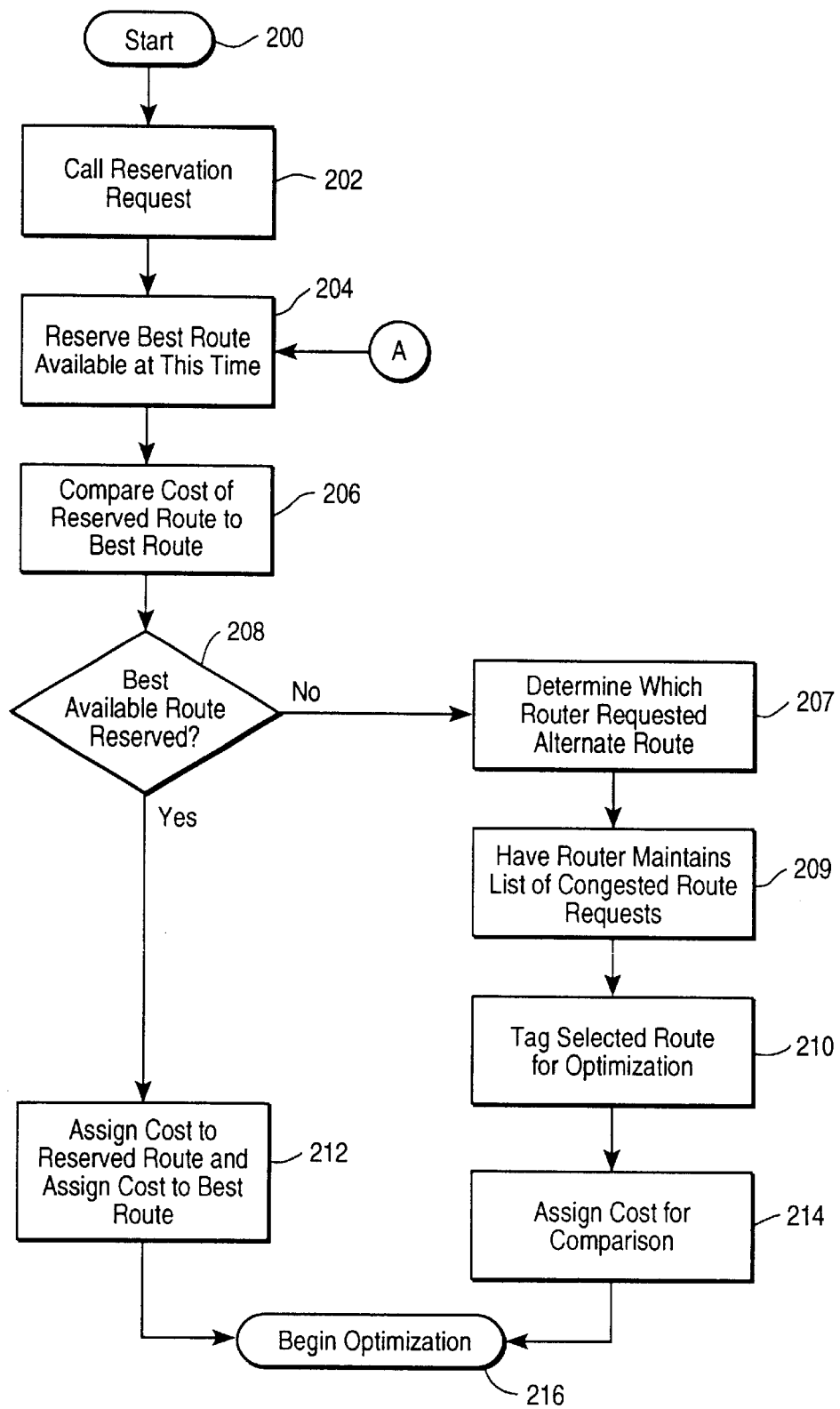
FIG_3

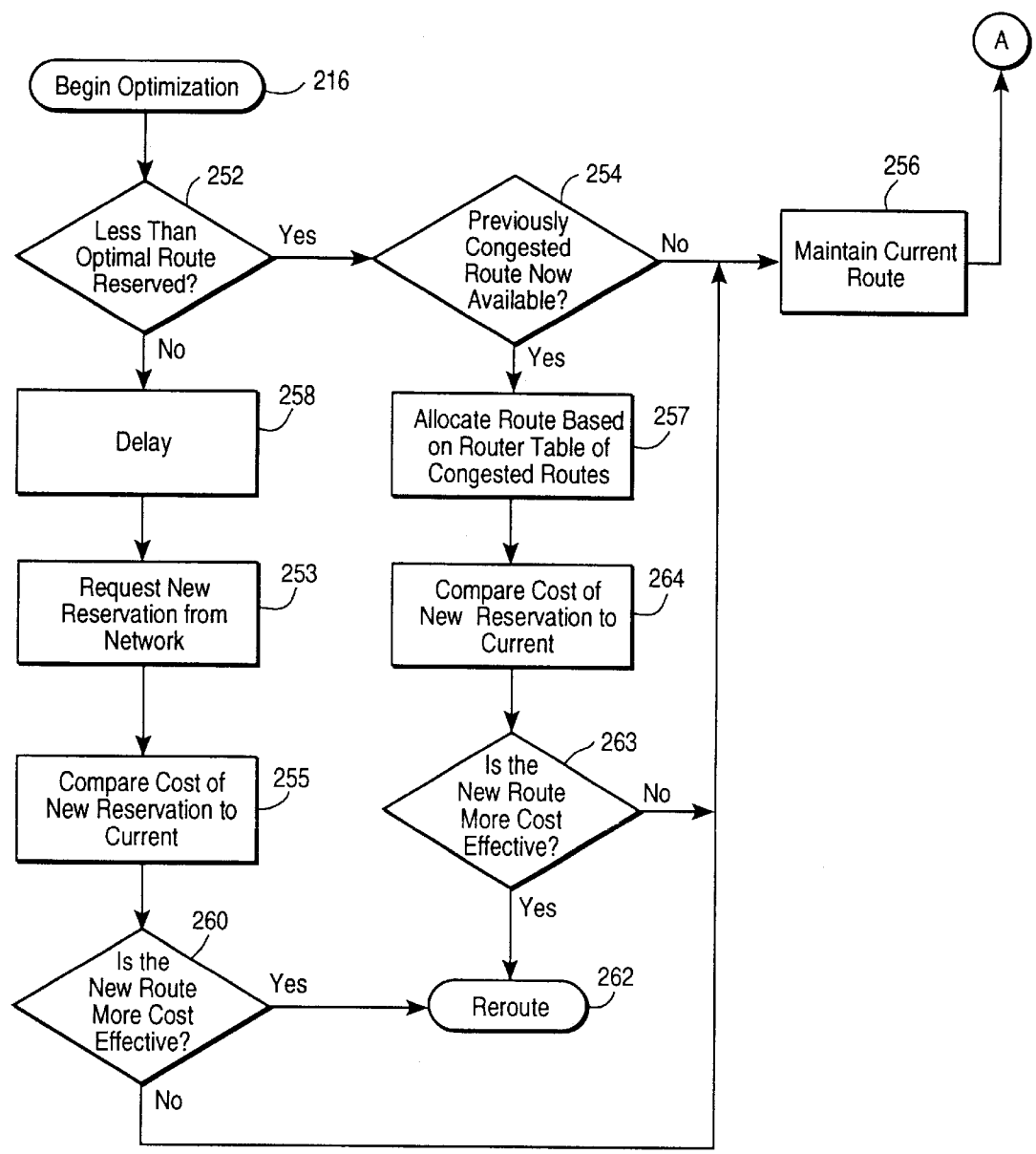
FIG_4

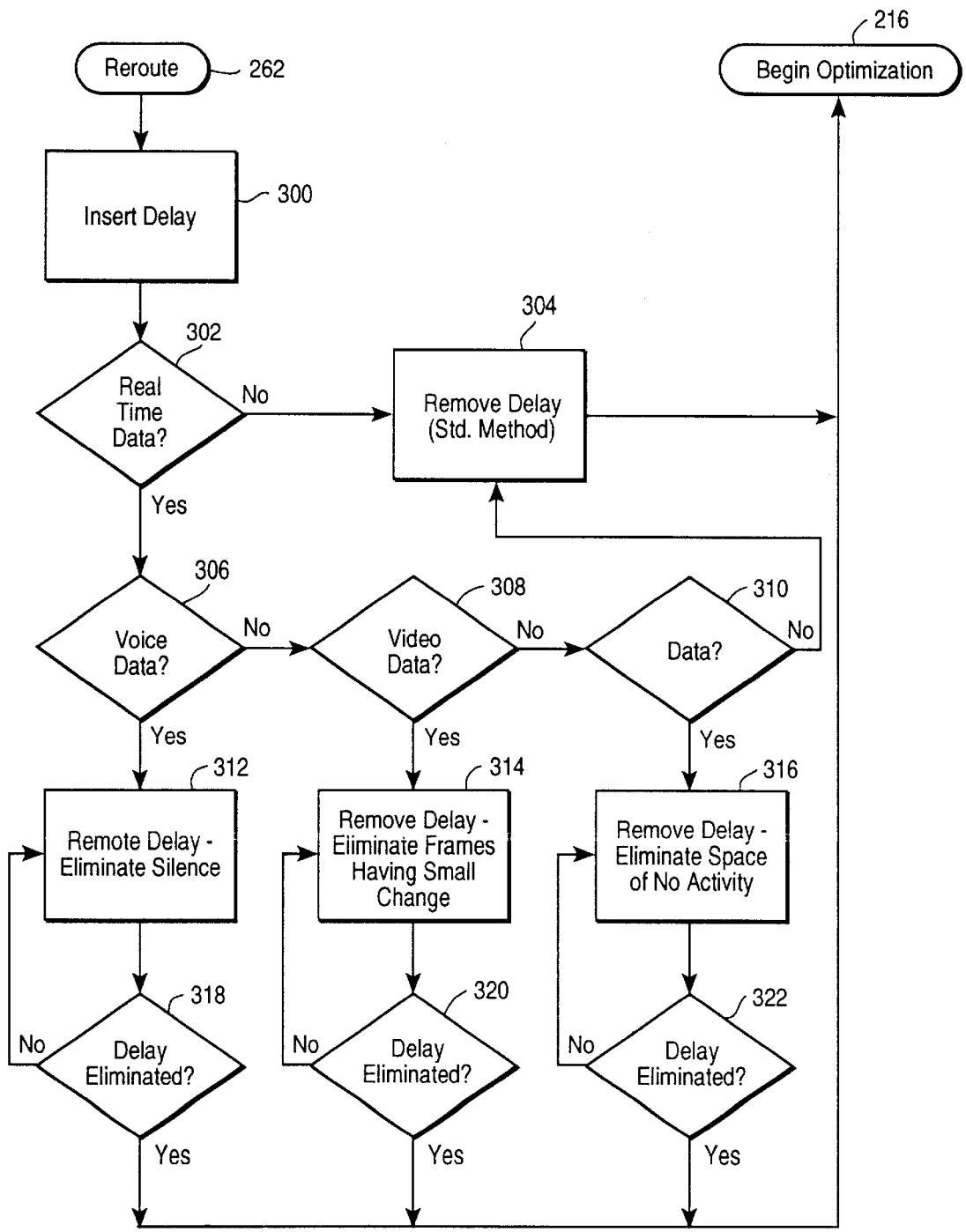
FIG_5

APPARATUS AND METHOD FOR NETWORK RESOURCE PRESERVATION

CROSS REFERENCE TO RELATED APPLICATIONS

This invention is related to APPARATUS AND METHOD FOR PREVENTING NETWORK REROUTING, Ser. No. 08/896,321 filed on even date herewith.

BACKGROUND OF THE INVENTION

1. Field of the Invention

This invention generally relates to network resource reservation system and, more particularly, to a network rerouting system for enabling continuous dynamic optimization of network connections anytime during call set-up and during the duration of the call for networks carrying data and, in particular, real-time data.

2. Description of the Prior Art

It is well known that modern packet, frame, or cell based telecommunications reservations protocols require the reservation of bandwidth in a network for a particular connection. Generally, this bandwidth is reserved at the time the call is set up. Based on the requested bandwidth, particular routes are chosen to form a connection over which the data will travel.

In certain instances, the most advantageous links may be congested at call set-up time or the requested bandwidth may not be available. This causes a reservation to be made on a route having links that are less than optimal. Furthermore, once the reservation is made, the reserved route may become sub-optimal at a later time, either before or after the call is made. Unfortunately, therefore, the most optimal routes become unavailable for use by the network.

Although rerouting algorithms for choosing alternate data routes for non real-time or non-isochronous data are known, they are used specifically in the instances of route failure and fall-back. In particular, rerouting is used in instances where the originally reserved route for some reason, such as a link failure, becomes unavailable and the connection must be rerouted onto an alternate route. These known rerouting algorithms cause each node in a network to be assigned to one or more predetermined alternate routes. However, the alternate routes are less optimal than the originally chosen route because they usually have less bandwidth or a greater number of nodes and hops than the initial route. Therefore, rerouting is also used in a fall-back mode wherein once the original route becomes available again, the connection is routed back to the original route. As mentioned above, however, route optimization for selecting a route more optimal than the original reserved route is not possible.

During any type of rerouting procedure, packet ordering issues must be dealt with. For example, when a call is rerouted because of a link failure, as mentioned above, the alternate route is a less optimal one. In particular, the original route may have only one intermediate node and two hops. In this case, the total travel time for the packet may only be eight milliseconds per hop and one millisecond at the intermediate node, for a total of seventeen milliseconds travel time. In contrast, the alternate route may have, for example, two intermediate nodes and three hops. In that case, the packet may take five milliseconds to travel the hop from the source node to the first intermediate node, seven milliseconds to travel from the first intermediate node to the second intermediate node, and another five milliseconds to travel from the second intermediate node to the end node. In addition, each of the intermediate nodes may require a one millisecond transmit time. Therefore, the total travel time for the packet would be nineteen milliseconds on the alternate route.

As can be seen, the exemplary alternate route may require two milliseconds longer travel time for each transmitted packet to reach the end node. Therefore, when the route is changed from the original route to the less optimal alternate route, the order of the packets will remain unchanged because the first packet being transmitted on the alternate slower route will reach at a time later than the last packet transmitted on the original faster route. Similarly, when a call is placed on a route having relatively low bandwidth, the data packets will reach the end node more slowly than when traveling on a route having greater bandwidth. Accordingly, no packet ordering problem will arise.

However, packet ordering may be a problem during fall-back. In particular, using the above example, if the original route is seventeen milliseconds long and the alternate route is nineteen milliseconds long, the last data packet transmitted on the slower route may reach the end node at a time after a later sent packet on the more optimal route reaches the end node. Because the later sent packet reaches the end node ahead of a prior sent packet, the packets become disordered.

Therefore, there is a need for a rerouting system wherein an alternate route for a communication network that is more optimal than the original reserved route may be dynamically chosen anytime both during call set-up and during the duration of the call. In addition, there is a need for a system wherein packet ordering problems are eliminated and route optimization through rerouting is enabled for real-time data.

SUMMARY OF THE INVENTION

Briefly, the present invention relates to a method and apparatus for routing data in a communications network for dynamically optimizing bandwidth. The system includes a network control unit for establishing an initial communications route, a route comparator for determining whether the initial communications route is optimal, and a rerouting control unit for establishing an alternate communications route when the alternate communications route is determined to be more optimal than the initial communications route.

A data routing system for dynamically optimizing bandwidth according to one embodiment of the present invention further includes a packet reordering unit for reordering data packets to maintain the originally transmitted packet sequence of the data packets on the alternate route.

BRIEF DESCRIPTION OF THE DRAWINGS

Other features, objects and advantages of the present invention will become readily apparent and understood upon consideration of the following detailed description and attached drawings, wherein:

FIG. 1 is an overall block diagram of the network resource preservation system in accordance with the present invention.

FIG. 2 is a schematic diagram illustrating a typical communication network.

FIG. 3 is a flow diagram for establishing the initial communications route.

FIG. 4 is a flow diagram for optimizing the route over which the data travels by selecting a more desirable route.

FIG. 5 is a flow diagram for rerouting the data from the initial route to the alternate route and maintaining packet sequence.

DETAILED DESCRIPTION OF THE INVENTION

The present invention is a system and method for dynamic optimization of bandwidth in a communications network carrying data, which is particularly useful for real-time or isochronous data such as voice, video or other data. The system has the ability to insert delays for maintaining packet sequence to accommodate for a more optimal route being chosen while continuously monitoring the data stream for an opportunity to remove the delay.

Thus, the system of the present invention provides a platform for enabling rerouting of data over an alternate route in a communications network to take advantage of available routes that provide a more optimal route than the initially reserved route. A more optimal route generally provides greater bandwidth or less routing delay time for the same or less cost. The packet resequencing ability allows rerouting to take place continuously in order to optimize the call, without causing the packet sequence to be altered at any time. Furthermore, the system is dynamic in that alternate routes may be established and implemented automatically by the system at anytime during the call setup procedure and at anytime while the call is in progress.

Turning now to the drawings and with particular attention to FIG. 1, a block diagram illustrating a network rerouting and optimization system according to an embodiment of the present invention is shown. The rerouting and optimization system 100 includes a network control unit ("NCU") 102 for establishing an initial route between a source node and an end node. The NCU 102 stores in a memory (not shown) the initially assigned route. The NCU 102 is coupled to a route comparator ("RC") 104 for assigning a cost for the established initial route and for assigning a cost to each subsequent route that may be contemplated as a possible alternate route. The RC 104 cooperates with the NCU 102, for example, by accessing the NCU's memory. The costs of the routes may be based on the number of hops, the number of nodes, or the time required per hop or per node, or any combination thereof. The costs of the routes are then compared against one another to determine the most advantageous or cost-effective alternate route. The RC 104 is coupled to a Reroute Control Unit ("RCU") 106 for enabling the initial route to be interrupted and the new alternate route to be connected, based on the cost comparison performed by the RC 104. The RC 104 outputs its cost comparison to the RCU 106. The RCU 106 then causes appropriate control information to be inserted such that the new route is accomplished. The RCU 106 is coupled to a Packet Reordering Unit ("PRU") 108 which ensures that real-time data packets traveling on the alternate route do not reach the end node out of proper sequence. The PRU 108 does this, for example, by removing gaps inherent in voice or video signals. For nonisochronous data, standard methods apply.

Referring to FIG. 2, a simplified route for a network connection is shown. As can be seen, several routes are available from the source node 150 to the end node 152. Typically, communications networks have one or more routers 151 and one or more intermediate nodes 154, 156, 158, 160, 162, 164 and one or more hops 157, 159, 161, 163, 165, 167, 169, 171 connecting the intermediate nodes together. The intermediate nodes are also connected to the source node 150 and end node 152 to complete connection of a communications route. The router 151 determines the nodes and hops that are used in completing a particular connection.

Generally, in communication networks, the best routes are ones having the fewest number of hops between the source and the endpoint, which allows for faster travel over the route, or the routes having the greatest amount of bandwidth, which allows more data to travel concurrently over the same line, thereby effectively increasing data throughput through the route. Since the most advantageous links may be congested when the call is being set-up, the requested bandwidth or links may not be available and the call may be placed over relatively less optimal links.

In order to take advantage, however, of the most optimal connections as resources become available, the present invention monitors the condition of all possible links in the network in real-time. This rerouting process is repeated many times both during call set up and while a call is in progress. Furthermore, the invention enables the rerouting process to utilize routes that are more optimal than the original route.

In a first optimization method, at a predetermined time interval, the system verifies that the reservation placed is still optimal by requesting a new reservation from the network. For example, the NCU 102 requests a new reservation between the currently active link connecting node 150 and node 152. The route selected by the NCU 102 is then compared to the previous route. More particularly, the existing route stored in the NCU 102 has a corresponding cost determined by RC 104. The stored route's cost is then compared to a newly-calculated new route's cost. If found to be more cost effective, the reservation is changed. That is, the RC 102 effects the route change by inserting, for example, additional routing control information. The PRU 108 inserts or removes delay as necessary. In another optimization method, if a less than optimal reservation was originally placed, the router that used an alternate route keeps a list of congested route requests. When any of the congested routes becomes available, the system allocates the newly available bandwidth to one of these more optimal routes, if the new route is more cost effective.

Referring to FIG. 3, a flow diagram is shown depicting reroute procedures to enable alternate routes to be chosen to carry data. Each time a call is placed as illustrated in step 200, the NCU 102 requests a call reservation in step 202 and surveys all the routes on the network in search of the most optimal route. A reservation is then placed for the best available route in step 204. Generally, the term "best" as used herein, describes the most optimal route available during call set-up time, based on cost comparison data. Cost may be a function of the number of links, link speeds and bandwidth. Therefore, the best route is a route optimally providing fast links and greatest bandwidth at the lowest cost.

In step 206 the route comparator 104 compares the cost of the reserved route to the best route and in step 208 determines whether the best route was reserved. If the best route was not reserved because it was not available, the system determines which router requested the alternate route in step 207. In step 209, the router that requested the alternate route keeps a list in memory of all the routes it found to be congested. The reserved route is then tagged for later optimization in step 210 and a cost is assigned and stored to be used for comparing with other routes in step 212. If the best route was reserved in step 208, then the reserved route is also assigned a cost for comparison. The so-called best route will be compared with other routes in the event an even better route becomes available at a later time. After route costs have been assigned in step 214, the system then begins the optimization process in step 216 to ensure that the best available route is being utilized.

Turning to FIG. 4, the optimization flow diagram 216 is shown wherein the system determines whether the current reserved route may be optimized. In step 252 the system determines whether a less than optimal route was placed. As discussed above, this may include accessing the stored list of congested links. If by accessing the stored list, in step 254 the system checks the list of previously congested routes to determine whether one of these routes is now available. If a previously-congested more optimal route is still not found to be available, then the current route is maintained in step 256 and the system returns to step 204 (FIG. 3). If, however, a lower cost, previously-congested route is found to be available in step 254, then the rerouting control unit 106 will allocate a new route based on one of the previously congested routes in steps 257. The cost of the newly reserved route is then compared to the cost of the current route in step 264. If in step 263 it is determined that the newly reserved route is indeed more cost effective than the current route, then the call is rerouted to the more optimal route in step 262. If the more optimal route is not more cost effective, then the current route is maintained in step 256.

Referring once again to step 252, if it is determined that a less than optimal route was not reserved, that is, the then best route was selected, the system will wait a predetermined amount of time in step 258 before requesting a new reservation from the network in step 253. In step 255, the cost of the new reservation is compared to the cost of the current route in a manner similar to that discussed above. If it is determined in step 260 that the new route is more cost effective, the RCU 106 will reroute the current call to the optimal route in step 262. However, if the new route is not more cost effective, then the current route is maintained in step 256.

FIG. 5 shows a rerouting flow diagram wherein the original route is interrupted and the optimal route, as described above, is selected. This process may be repeated continuously during a single call, thereby enabling the most optimal route available to be used at all times. A packet reordering unit is used to ensure that data is not received at the endpoint node out of its intended sequence.

In particular, when the call has been rerouted to the alternate route in step 262, a delay is entered into the route in step 300. For example, packet transit may be temporarily paused (i.e., the packet or packets may be briefly held in a node buffer or memory unit). By adding this delay, packet travel time on the new route will be the same as, or greater than, the packet travel time on the original route. As such, the packets will be received by the endpoint in the order transmitted.

However, the advantage of the new alternate route would be lost if the added delay is retained. To enable the system to make best use of the newly acquired bandwidth, the added delay must be removed. Generally, packet routing issues are handled quite easily for non real-time data. If packets are received out of order after the delay has been removed, an error is generated by the end node or receiving unit and the switched packets may be retransmitted in their proper order over the rerouted line. With regular data, periods of inactivity in which data is not transmitted can be used to catch up to the delay. Other known methods are also commonly available to reorder out of sequence packets.

Real-time data, however, presents a problem. For instance, in the case of a telephone call, a packet ordering problem at the end node may cause parts of conversation to become garbled each time a more optimal route is chosen and packets received out of order. Retransmission of packets would take too long and therefore is not a feasible solution. Accordingly, the present invention monitors real-time data in the faster link when the slower original link has ceased transmitting. At that time, the added delay is removed by removing periods of silence inherent in the real-time data.

More particularly, the system in step 302 determines whether real-time data is being carried by the network. Real time or isochronous data is identified, for example, by a data type parameter or protocol element. Thus, the system knows whether the data is, for example, voice, video or other data. If standard, non-real-time data is being transmitted, the delay is removed in step 304 using commonly known methods, as described above. The system then returns to the optimization process in step 216. However, if real-time data is being carried on the network, the system then determines if the data is voice in step 306, or video in step 308 or other real-time data in step 310. If the system cannot determine the type of real-time data being carried, the system returns to the optimization process in step 216.

If voice data is found to be present, the network senses gaps in the voice (e.g., by detecting lower signal levels, as at the end of sentences or pauses in conversation) and removes the gaps from the transmitted signal. Thus, rather than continuing to maintain the delay that was initially inserted to maintain packet sequence, the system removes some of the gaps of the audio signal in step 312 and therefore reduce the added delay. The delay removal process is repeated to gradually eliminate all of the delay in step 318 to catch up to the new delivery rate so as to take best advantage of the new route.

Similarly, if video data is found to be present in step 308, the system looks out for video frames having small deltas, that is, small changes, between them, and removes these extra frames in the video signal in step 314. In step 320, this process is repeated to gradually eliminate all of the delay to catch-up to the new delivery rate so as to make the most efficient use of the new route.

Other real-time data in step 310 also has excess delays removed in step 316. Once again, the process is repeated until the delay is removed in step 322. In all cases, once the delay has been removed, the system returns to the optimization process to look for further, even more optimal, alternate routes.

Obviously, many modifications and variations of the present invention are possible in light of the above teachings. Thus, it is to be understood that, within the scope of the amended claims, the invention may be practiced otherwise than as specifically described above.

What is claimed and desired to be secured by Letters Patent of the United States is:

1. A network resource reservation system for dynamically rerouting data packets to optimize bandwidth in a communications network during call set-up time and during the duration of a call, comprising:

a network control unit for establishing an initial communications route between a source node and an end node for carrying the data;

a reroute control unit for establishing an alternate communications route when said alternate communications route is determined to be more optimal than said initial communications route, said determination being made periodically while a communication along said initial communications route is ongoing, wherein said determination may be made more than once during said communication, wherein more than one alternate route may be established during said communication, responsive to said determining; and a packet reordering unit for enabling the real-time data packets to travel to said end node in the proper sequence after said reroute control unit establishes said alternate communications route.

2. The network resource reservation system of claim 1 wherein the data is real-time data.

3. The network resource reservation system of claim 1 wherein said reroute control unit establishes said alternate predetermined communications route at any time during the call.

4. A network resource reservation system for dynamically rerouting data packets to optimize bandwidth in a communications network during call set-up time and during the duration of a call, comprising:

a network control unit for establishing an initial communications route between a source node and an end node for carrying the data;

a reroute control unit for establishing an alternate communications route when said alternate communications route is more optimal than said initial communications route; and a packet reordering unit for enabling the real-time data packets to travel to said end node in the proper sequence after said reroute control unit establishes said alternate communications route;

wherein said reroute control unit may interrupt said existing alternate predetermined communications route and establish a subsequent alternate predetermined communications route multiple times during the connection when said reroute control unit determines that said subsequent alternate predetermined communications route is optimal over said existing alternate predetermined communications route.

5. The network resource reservation system of claim 2 wherein said real-time data is voice data.

6. The network resource reservation system of claim 2 wherein said real-time data is video data.

7. A network resource reservation system for dynamically optimizing bandwidth in a communications network for enabling data to travel from a first point to a second point, comprising:

a network control unit for establishing an initial predetermined communications route between the first point and the second point for carrying the data;

a route comparator for periodically determining whether said initial predetermined communications route is optimal during a communication along said initial predetermined communications route, wherein said determining may occur more than once during said communication; and a reroute control unit for interrupting said initial predetermined communications route and establishing an alternate predetermined communications route when said route comparator determines that said alternate predetermined communications route is more optimal relative to said initial predetermined communications route, wherein more than one alternate route may be established during said communication responsive to said determining.

8. The network resource reservation system of claim 7 further including a packet reordering unit for maintaining sequence of the data packets when said alternate predetermined communications route is enabled.

9. The network resource reservation system of claim 8, wherein said packet reordering unit inserts delays between the data packets to maintain sequence of the data packets when said alternate predetermined communications route is enabled, said packet reordering unit for further removing said inserted delays subsequent to said packet sequence being maintained on said alternate predetermined communications route.

10. A network resource reservation method for dynamically rerouting real-time data packets to optimize bandwidth in a communications network, comprising:

establishing an initial communications route between a source node and an end node for carrying the real-time data packets;

determining, while a communication on said initial predetermined communications route is ongoing, whether said initial predetermined communications route is optimal, wherein said determining may occur periodically more than once during said communication;

establishing an alternate communications route when said alternate communications route is more optimal than said initial communications route, wherein more than one alternate route may be established during said communication responsive to said determining; and enabling the real-time data packets to travel to said end node in the proper sequence after said reroute control unit establishes said alternate communications route.

11. A network resource reservation system for dynamically optimizing bandwidth in a communications network for enabling data to travel from a first point to a second point, comprising:

means for establishing an initial predetermined communications route between the first point and the second point for carrying the data;

means for determining whether said initial predetermined communications route is optimal while a communication along said initial predetermined communications route is ongoing, wherein said determining may periodically occur more than once during said communication; and means for establishing an alternate predetermined communications route to carry the data when said route comparator determines that said alternate predetermined communications route is optimal over said initial predetermined communications route, wherein more than one alternate route may be established during said communication responsive to said determining.

12. The network resource reservation system of claim 11 further including means for maintaining sequence of the data packets when said alternate predetermined communications route is enabled.

13. A system according to claim 4, said packet reordering unit adapted to determine whether said data is voice data or video data.

14. A system according to claim 13, wherein said packet reordering unit is adapted to remove gaps in voice signals.

15. A system according to claim 14, wherein said packet reordering unit is adapted to remove video frames having small changes from said data.

16. A network resource reservation system for dynamically rerouting data packets to optimize bandwidth in a communications network during call set-up time and during the duration of a call, comprising:

a network control unit for establishing an initial communications route between a source node and an end node for carrying the data;

a reroute control unit for establishing one or more alternate communications routes when said one or more alternate communications routes are determined to be more optimal than previously established ones of said initial communications route or one or more alternate communications routes; and a packet reordering unit for enabling the real-time data packets to travel to said end node in the proper sequence after said reroute control unit establishes said one or more alternate communications routes.

17. A system according to claim 16, said packet reordering unit adapted to determine whether said data is voice data or video data.

18. A system according to claim 17, wherein said packet reordering unit is adapted to remove gaps in voice signals.

19. A system according to claim 18, wherein said packet reordering unit is adapted to remove video frames having small changes from said data.

* * * * *